United States Patent [19]

Beckmann et al.

[11] Patent Number: 4,805,483

[45] Date of Patent: Feb. 21, 1989

[54] CONNECTING ROD WITH A SHANK COMPOSED OF FIBER COMPOSITE MATERIAL

[75] Inventors: Hans-Dieter Beckmann, Gifhorn; Siegfried Brudgam, Brunswick; Dieter Roeper, Ulm, all of Fed. Rep. of Germany

[73] Assignee: Volkswagen AG, Wolfsburg, Fed. Rep. of Germany

[21] Appl. No.: 61,183

[22] Filed: Jun. 10, 1987

[30] Foreign Application Priority Data

Jun. 28, 1986 [DE] Fed. Rep. of Germany ....... 3621704

[51] Int. Cl.⁴ .......................... G05G 1/00; F16C 7/02
[52] U.S. Cl. .................... 74/579 E; 403/344; 384/268; 74/594
[58] Field of Search ............... 74/579 R, 579 E, 581, 74/587, 593, 594, 44, 588, 589; 123/197 AB, 197 AC; 403/38, 344; 29/156.5 R, 156.5 A; 384/268

[56] References Cited

U.S. PATENT DOCUMENTS

| 116,542 | 7/1871 | Blake | 74/594 |
|---|---|---|---|
| 4,184,384 | 1/1980 | Levine | 74/579 E |
| 4,329,915 | 5/1982 | Schulz | 74/579 E |
| 4,555,961 | 12/1985 | Fischer | 74/579 E |

FOREIGN PATENT DOCUMENTS

| 3329001 | 12/1984 | Fed. Rep. of Germany | 74/579 E |
|---|---|---|---|
| 3542071 | 6/1986 | Fed. Rep. of Germany | 74/579 E |
| 54-20259 | 2/1979 | Japan | 74/579 R |
| 11462 | 1/1917 | United Kingdom | 74/594 |
| 981446 | 1/1965 | United Kingdom | 74/579 E |

Primary Examiner—Gary L. Smith
Assistant Examiner—Rodney M. Lindsey
Attorney, Agent, or Firm—Brumbaugh, Graves, Donohue & Raymond

[57] ABSTRACT

A connecting rod shank of a connecting rod is composed of a plurality of laminated plates having a thickness so that they can be introduced through a gap provided in a partially cylindrical base body of a loop tensioner for a tightening band which encloses the connecting rod shank.

10 Claims, 3 Drawing Sheets

CONNECTING ROD WITH A SHANK COMPOSED OF FIBER COMPOSITE MATERIAL

BACKGROUND OF THE INVENTION

The invention relates to a connecting rod having a connecting rod shank which is composed of a fiber composite material and extends essentially between a piston boss and a crank pin boss, furthermore with a tension-stressed flexible tightening band which in the manner of a loop surrounds the connecting rod and at least the piston boss, as well as with a loop tensioner encompassing housing-like the tightening band locally and pulling the band onto the contour of the connecting rod, whereby, moreover, a cylindrical crank pin bearing is set into the crank pin boss. In constructions of this kind, such as known, e.g., from DE-OS No. 34 16 011, F 16 C 7/02, the loop tensioner is fixed in its position on the connecting rod shank by additional means, in this case screws.

SUMMARY OF THE INVENTION

It is an object of the invention to improve structurally, with a view to simple large-scale series assembly, a connecting rod of the above-indicated kind while preserving its advantages, in particular its low weight.

Pursuant to this object, and others which will become apparent hereafter, one aspect of the present invention resides in the loop tensioner being supported on the crank pin bearing by means of an approximately semi-cylindrical base body which is provided with a center gap directed towards the piston boss and having a length which corresponds to the width of the connecting rod shank at this point. The connecting rod shank is composed of a plurality of laminated plates whose thickness, measured in the direction of the axis of the crank pin bearing, maximally equals the width of the gap measured in the axial direction, which laminated plates are supported on the base body. The plurality of plates also includes an additional plate which passes through the gap with a thickness corresponding to the gap width and is supported on the crank pin bearing.

A first, essential advantage of the invention is that additional arresting means for the loop tensioner and thus additional operational steps during assembly are dispensed with. Rather, the loop tensioner is designed in such a manner that due to the effect of the tightening band which, in a manner known in itself, may also consist of fiber material, the loop tensioner is pressed with its approximately semi-cylindrical base body onto the periphery of the crank pin bearing. In another embodiment, the bearing, when provided as a collar end bearing, can also effect an axial fixing of the loop tensioner and thereby of the connecting rod shank. In a further embodiment, in addition to the loop tensioner whose purpose is essentially the adjustment of the shape of the loop to the contour of the connecting rod shank, tensioning means are provided for the tightening band. When the tensioning means are provided on a side of the crank pin boss facing away from the piston boss, virtually no additional effort is entailed in that the tensioning means can be utilized at the same time to decrease the oscillating masses of the connecting rod and piston.

An example of an embodiment of the invention will be explained below with reference to the drawing.

DETAILED DESCRIPTION OF THE PREFERRED EMBODIMENTS

Figure 1:
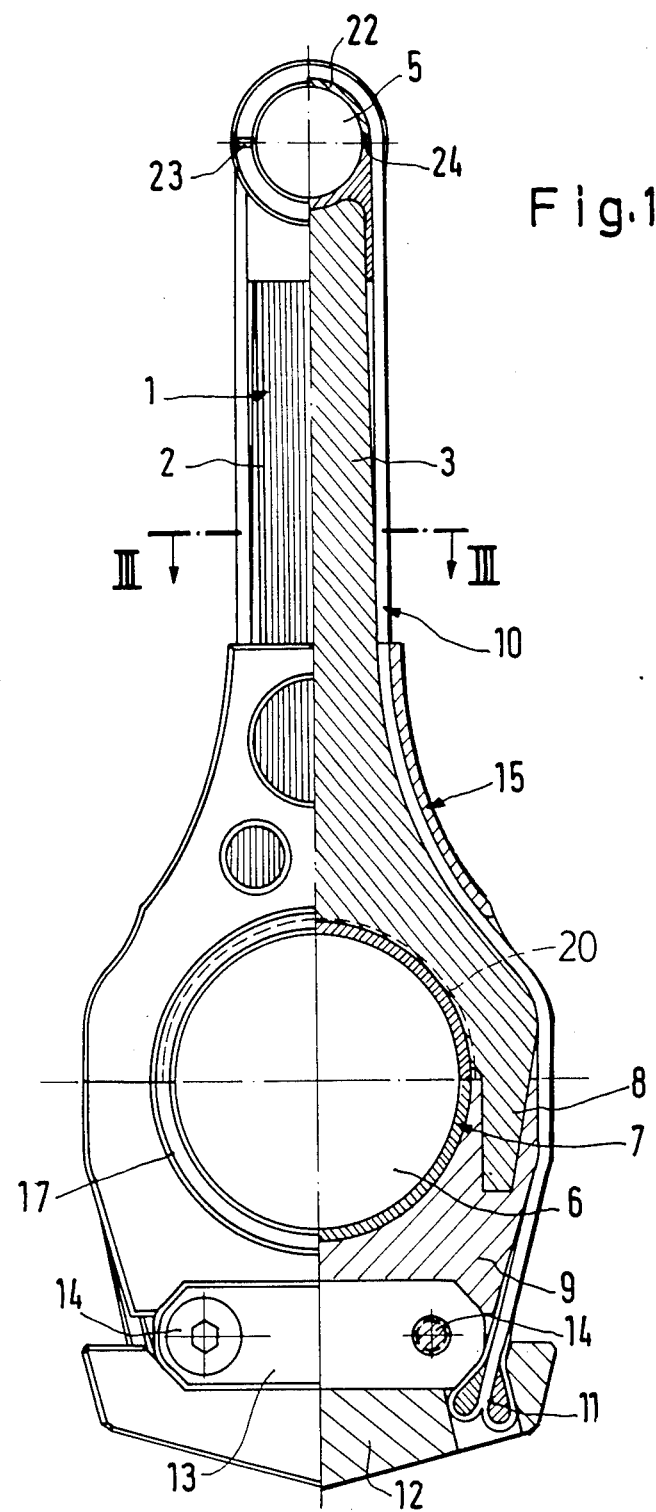
FIG. 1 shows a view of a connecting rod pursuant to the present invention in the axial direction, partly in center section.

As seen in the drawings, the connecting rod includes a connecting rod shank 1 which in this embodiment is composed of three laminated plates 2, 3, 4. Following assembly of the connecting rod, the plates are, e.g., cemented together so that they can also transmit shearing stresses parallel to their surfaces. Above the connecting rod shank 1 appears a piston boss 5 whereas on the bottom, the connecting rod ends above a crank pin bearing 7 surrounding a crank pin boss 6. By means of lateral extensions of which in FIG. 1 is discernible only the one designated by 8, the connecting rod shank 1 is in a positive connection, ensuing force introduction in accordance with the materials utilized, with a bearing bridge 9 constituted, e.g., of metal.

Piston boss 5 and connecting rod shank 1 are surrounded by a loop-like tightening band 10 the ends of which, as shown for the right-hand band end 11 in FIG. 1, are contained by a bridge-like bearing 12. Between the bearing 12, which serves as a weight reducing the oscillation of mass parts, and the component 9 are provided wedge elements 13 which are actuated by screws 14 so as to permit tensioning of the tightening band 10 and at the same time fixedly clamping the tightening band ends 11.

A loop tensioner 15 is provided which serves, with a view toward obtaining a narrow connecting rod, to pull the tightening band 10 down on the correspondingly narrowed contour of the connecting rod shank 1. As an essential component the loop tensioner 15 contains a semi-cylindrical base body 16 with which it bears on the crank pin bearing 7 designed as a collar end bearing. With collars 17 and 18, the divided crank pin bearing 7 offers axial securing of the loop tensioner 15 as well as of the connecting rod shank 1.

Figure 2:
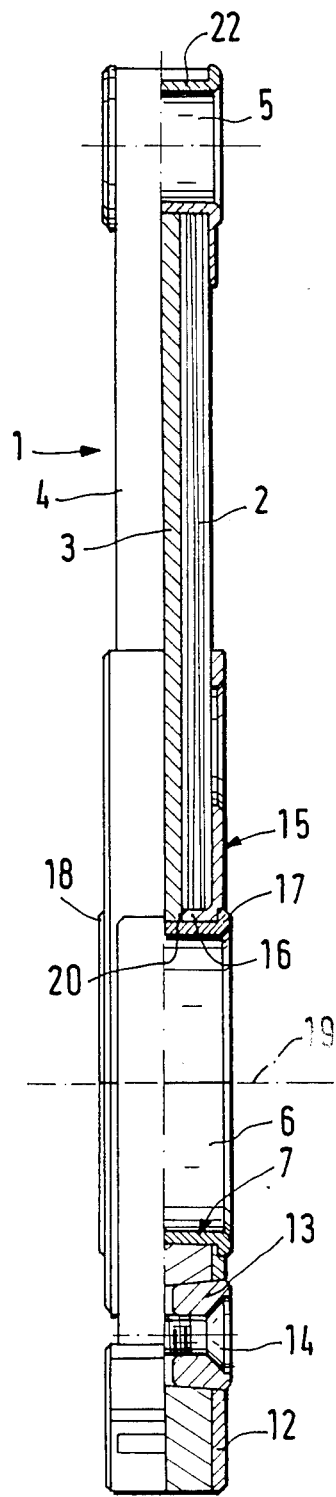
FIG. 2 is a side view of the connecting rod in FIG. 1, likewise in center section.
Figure 3:
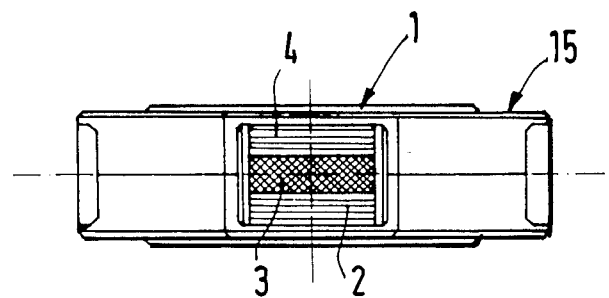
FIG. 3 is a cross section indicated in FIG. 1 by III—III.

From FIG. 2 in particular it is apparent that the base body 16 holds the outer laminated plates 2 and 4 on the bottom. Accordingly, in final analysis, it is arrested in the direction of the connecting rod axis by the tensioning of the tightening band 10. Thus, additional means of fixing can be dispensed with.

Figure 4:
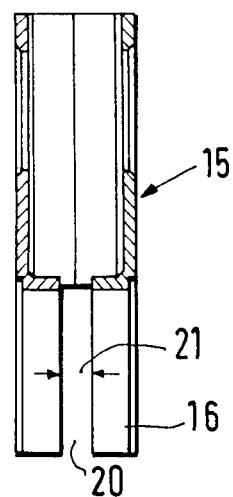
FIG. 4 is a center section through the loop tensioner.

As stated repeatedly, the connecting rod shank 1 is not rendered in one piece but rather, in this embodiment, is composed of three laminated plates. The laminated plates are of equal thickness as measured in the direction of the axis 19 of the crank-pin boss 6. For assembly, there is provided in the base body 16 of the loop tensioner 15 a gap 20 extending, in this embodiment over 180°, i.e., over the entire circumference of the base body 16 which can be easily discerned in FIG. 4. The gap has a width 21 measured in the direction of the axis 19 of the crank pin boss 6 which is at least equal to the thickness of each of the laminated plates 2, 3 and 4. Thus, it is possible on assembly to first introduce the tightening band 10 into the loop tensioner 15 which is composed of two halves. Thereafter, the two outer laminated plates 2 and 4 are introduced one after the other through the gap 20 from the bottom, as shown in the figures, and are then moved to the left and the right, respectively, (in FIG. 4) into their final positions. Thereafter the middle laminated plate 3 is put into position. As shown in FIG. 2, the middle plate 3 is somewhat longer than the two outer laminated plates 2 and 4, namely, it is longer by the thickness of the base body 16 material, so that in the finished condition of the connecting rod, it bears directly on the crank pin bearing 7. Following the assembly process, the laminated plates 2, 3 and 4 are joined, e.g., by cementing.

The piston pin bearing 22 may also be rendered as a collar end bearing holding the end face of the connecting rod shank 1, as shown in FIG. 2. It may also be composed of a plurality of parts providing for gaps 23 and 24, as shown in FIG. 1, so that the piston pin, not shown in the figures, is clamped into the piston pin bearing 22 due to the tension force of the tightening band 10. In this case, additional means for fixing of the pin can be dispensed with.

Thus, by means of the invention is created a connecting rod which can be easily assembled, whereby the ease of assembly is not attained at the cost, e.g., of the considerable weight-saving advantages of a connecting rod produced by making use of composite fiber materials.

While the invention has been illustrated and described as embodied in a connecting rod with a shank composed of fiber composite material, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by letters patent is set forth in the appended claims.

We claim:

1. An improved connecting rod with a connecting rod shank composed of a fiber composite material and extending essentially between a piston boss and a crank pin boss, furthermore with a tension-stressed flexible tightening band which surrounds the connecting rod shank and at least the piston boss in a loop-like manner, as well as with a loop tensioner encompassing the tightening band locally in a housing-like manner and pulling the band onto the surface of the connecting rod shank, moreover, a cylindrical crank pin bearing is set into the crank pin boss, the improvement comprising: the loop tensioner being supported on the crank pin bearing by means of an approximately semi-cylindrical base body which is provided with a center gap directed towards the piston boss and having a length which corresponds to the width of the connecting rod shank at this point; and the connecting rod shank being composed of a plurality of laminated plates having a thickness, measured in the direction of the axis of the crank pin bearing, which maximally equals the width of the center gap measured in the direction of the crank pin bearing axis, the laminated plates being supported on the base body, and an additional plate which passes through the gap with a thickness corresponding to the gap width and is supported on the crank pin bearing.

2. A connecting rod as defined in claim 1, wherein the laminated plates are cemented together.

3. A connecting rod as defined in claim 1, wherein the crank pin bearing is provided with collar end bearings so as to axially secure the loop tensioner.

4. A connecting rod as defined in claim 1, wherein the gap extends 180° over the circumference of the base body.

5. A connecting rod as defined in claim 1, and further comprising tensioning means for tensioning the tightening band on a side of the crank pin bearing facing away from the piston boss.

6. A connecting rod as defined in claim 5, wherein the tensioning means includes a bridge-like bearing for the ends of the tightening band, and wedge elements driven by means of screws between the tightening band ends and a bearing bridge forming a component of the crank pin boss.

7. A connecting rod as defined in claim 6, wherein the wedge elements are provided so as to fix the ends of the tightening band.

8. A connecting rod as defined in claim 1, wherein the crank pin boss is closed by a bearing bridge which laterally is connected positively with the laminated plates forming the connecting rod shank.

9. A connecting rod as defined in claim 1, wherein the piston boss is rendered in a divided manner forming gaps so as to wedge-in the piston pin.

10. A connecting rod, comprising: a connecting rod shank composed of a fiber composite material and extending between a piston boss and a crank pin boss; a tensionstressed flexible tightening band provided so as to surround the connecting rod shank and at least the piston boss in a loop-like manner; a loop tensioner provided so as to encompass said tightening band in a housing-like manner and locally pull said band onto the surface of the connecting rod shank; a cylindrical crank pin bearing having an axis and being set 10 into the crank pin boss; and an approximately semi-cylindrical base body provided so as to support said loop tensioner on said crank pin bearing, said base body having a center gap oriented towards the piston boss and having a length which corresponds to the width of said connecting rod shank at this position, said connecting rod shank being made of a plurality of laminated plates each having a thickness, measured in the direction of said crank pin bearing axis, which maximally equals the width of said center gap measured in the direction of said crank pin bearing axis, said plurality of laminated plates being supported on said base body, and including an additional plate having a thickness corresponding to said gap width and being provided so as to pass through said gap and be supported on said crank pin bearing.

* * * * *